Feb. 2, 1960     S. W. HENDERSON     2,923,117
ROTARY CUTTER
Filed May 20, 1957     2 Sheets-Sheet 1
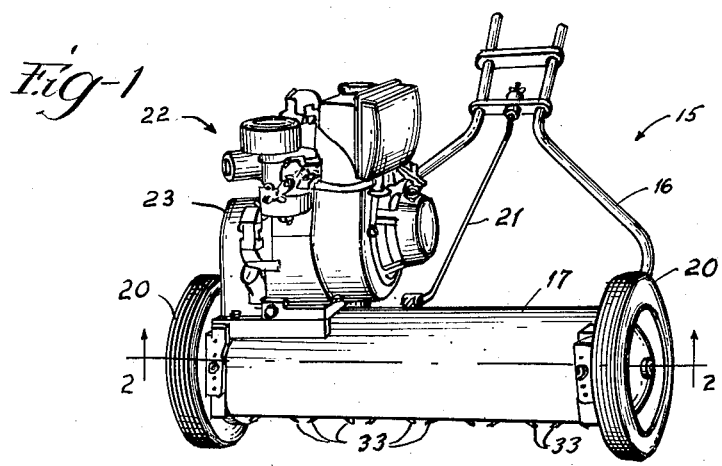
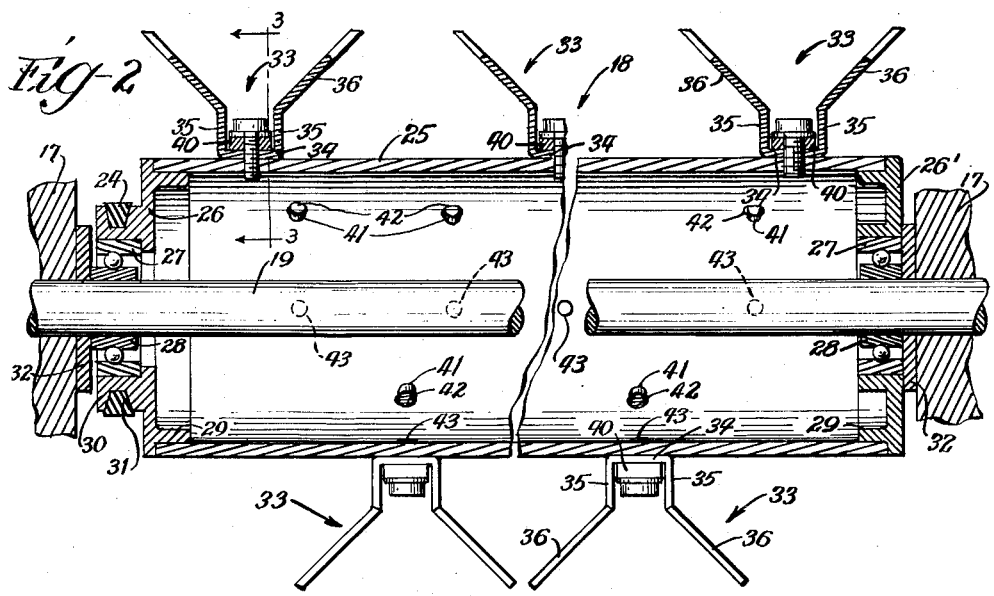
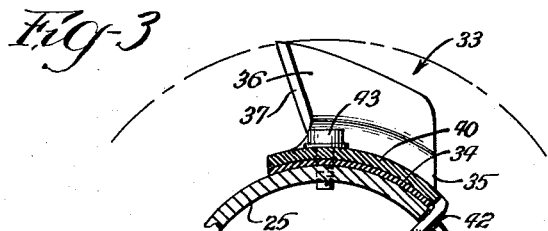
INVENTOR.
Scott W. Henderson
BY
Cromwell, Greist & Warden
Attys.

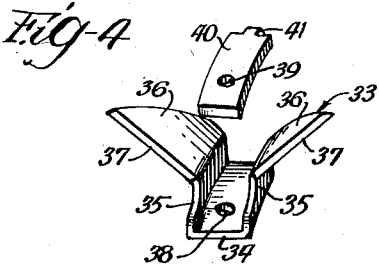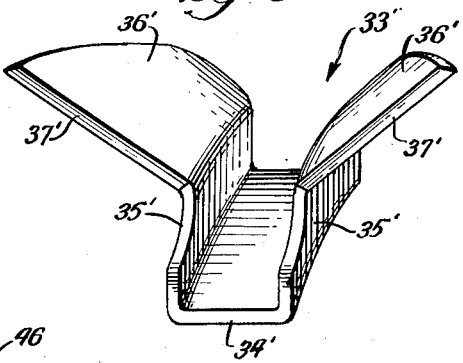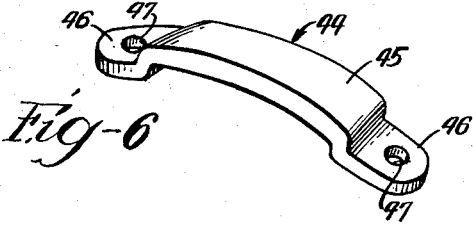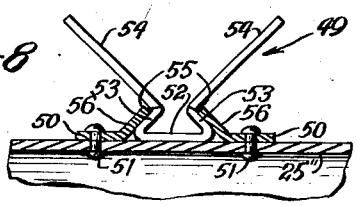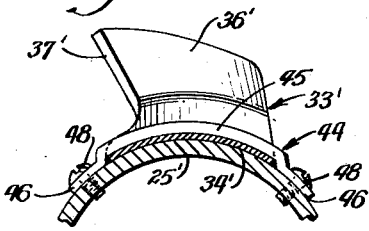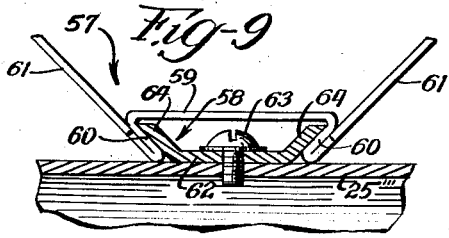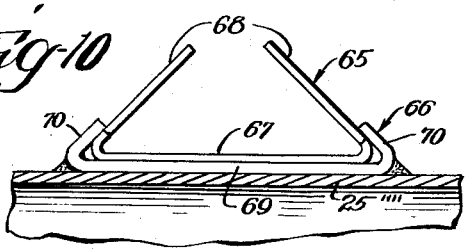

United States Patent Office 2,923,117
Patented Feb. 2, 1960

2,923,117

ROTARY CUTTER

Scott W. Henderson, Kokomo, Ind.

Application May 20, 1957, Serial No. 660,385

4 Claims. (Cl. 56—294)

The present invention is directed to a new and improved form of rotary cutter for use in lawn mowers and the like, the cutter being in the form of a rotatable tubular shaft having readily detachable blade members carried thereby on the outer periphery thereof. More specifically, the present invention is directed to new and improved detachable cutter blade structures particularly adapted for mounting on a tubular sleeve-like shaft for rotation therewith to provide impact cutting action at relatively high rotatable speeds without the necessity of using a cutter bar of known type and arrangement.

It is an object of the present invention to provide a new and improved form of rotary cutter particularly adapted for use with power operated lawn mowers, the cutter being in the form of a tubular shaft which is adapted for being belt driven by the power unit of a lawn mower, the outer periphery of the shaft carrying a plurality of spaced blade members which are detachably mounted thereon, the blade members being of a new and improved design readily adapting the same for variation in structural arrangement without loss of efficiency in cutting action.

A further object is to provide a new and improved rotary cutter of the type described wherein variable forms of blade holding means can be efficiently used to detachably hold blade members on the outer periphery of a rotatable tube, the blade holding means being adapted for readily releasing the blade members attached to the tube thereby for maintenance purposes, such as sharpening, or for replacement.

Other objects not specifically set forth will become apparent from the following detailed description made in conjunction with the drawings wherein:

Fig. 1 is a fragmentary perspective of one form of power driven lawn mower including therein the improved rotary cutter of the present invention;

Fig. 2 is an enlarged fragmentary transverse section of the rotary cutter taken on line 2—2 of Figure 1 illustrating one form of mounting the same in the mower for operation by the power unit thereof;

Fig. 3 is an enlarged fragmentary longitudinal section of one form of blade member and blade holding means provided thereafore in detachably mounting the same on the outer periphery of the rotatable tube taken on line 3—3 of Fig. 2;

Fig. 4 is an exploded perspective of the blade member and blade holding means of Fig. 3;

Fig. 5 is an enlarged perspective of a modified form of blade member;

Fig. 6 is a perspective of a modified form of blade holding means particularly adapted for use in detachably mounting the blade member of Fig. 5 on the outer periphery of the tube;

Fig. 7 is a fragmentary longitudinal section similar to Fig. 3 and on a reduced scale of the manner in which the blade holding means of Fig. 6 is used to mount the blade member of Fig. 5 on the outer periphery of the tube;

Fig. 8 is a fragmentary section of another form of blade member and blade holding means;

Fig. 9 is a fragmentary section of still another form of blade member and blade holding means; and Fig. 10 illustrates still a further modified form of blade member and blade holding means.

In my earlier Patent No. 2,509,343, dated May 30, 1950, I disclose a cutter assembly utilizing paired blade members carried by a rotatable shaft. The rotatable cutter of the present invention as well as the various modified forms of blade members and blade holding means constitutes an improvement over the structural arrangement disclosed in my earlier patent. Rotary cutters of this type are particularly designed to cut grass and the like effectively without the use of a cutter bar or ledger plate in association therewith. The blade members carried by the rotating supporting member cuts vegetation with a sickle-like action at high impact speed rather than utilizing a shearing-type action such as is present where a cutter bar or ledger plate form a part of the structural arrangement.

In Fig. 1 a power mower 15 is illustrated as including a handle member 16 attached at the lowermost end thereof with a hood-like housing 17. A rotary cutter 18 shown in Fig. 2 is rotatably mounted within the housing 17 about a fixed shaft 19 the outer ends of which are journalled in rotatable wheels 20. The handle structure 16 is further attached to the housing 17 by a stabilizing rod 21. The top portion of the housing 17 supports a power unit 22 which, as illustrated, is a gas driven engine having a belt housing 23 forming a part thereof. Any suitable rotary cutter driving arrangement can be utilized such as the use of a belt 24 shown in Fig. 2 in driving engagement with the rotary cutter structure 18 and being driven by a suitable engine operated pulley located above the housing 17 and in the housing 23.

Referring particularly to Fig. 2, the rotary cutter structure 18 includes a tube 25 concentrically mounted about the shaft 19 by tube end structures or elements 26 and 26' carrying the outer race 27 of ball bearing structures, the inner race 28 of each being fixedly carried by the shaft 19. The tube end structures 26 and 26' are in the form of annular collars provided with a circumferentially continuous axial flange 29 received within the ends of the tube 25 and suitably attached thereto. The left tube end structure 26 as viewed in Fig. 2 is provided with an axially outwardly directed shoulder portion 30 having a belt receiving groove 31 therein which seats the belt 24 for rotating the tube 25 about the shaft 19. End plate washers 32 are received about the shaft 19 intermediate the end structures 26 and 26' and the housing 17.

The outer periphery of the tube 25 carries a pluarltiy of detachable blade members 33 which are mounted to form a plurality of longitudinally extending rows with the blade members of each successive row being offset to provide for overlapping cutting portions. This type of arrangement is conventional insofar as the positioning of blade members is concerned and is fully disclosed in my aforementioned patent. The staggered mounting of the blade members provides for standard cutting operation including a plurality of overlapping cutting paths to cut a swath that laps the immediately adjacent swath on either side thereof.

The preferred form of blade member structure and detachable blade holding member structure is shown in Figs. 2–4 wherein each blade member 33 is formed with a mounting portion of generally U-shape having an arcuate bottom wall 34 conforming with the curvature of the outer periphery of the tube 25. Opposite side margins of the bottom wall 34 having integrally formed therewith upstanding side walls 35 each of which has integrally formed at the top edge thereof an upwardly directed and outwardly inclined cutting portion 36. As particularly shown in Figs. 3 and 4, each cutting portion 36 is provided with a slightly forwardly inclined bevelled cutting edge 37 with the rear face of the cutting portion 36 being curved rearwardly from the outermost tip of the cutting edge 37 to its point of juncture with the top edge portion of its supporting side wall 35. The cutting portions thus defined are wing-shaped and the inclination of each cutting portion 36 relative to the outer periphery of the tube 25 defines an angle which is at least 45°. This angle of inclination allows the cutting portions 36 to readily shed fragments of vegetation such as grass which it severs during operation of the mower.

Each blade member 33 is provided with a drilled opening 38 through the bottom wall 34 thereof for alignment with a drilled opening 39 extending through a metallic, preferably non-flexible strap 40 constituting the blade member holding means for use with the blade member 33. The strap 40 is arcuate to conform with the shape of the bottom wall 34 of the blade member 33 and one end thereof is provided with an outwardly extending and downwardly depending lug or hook-like member 41 which is received in an aperture 42 in the tube 25. The strap 40 is received in engagement with the top surface of the bottom wall 34 and the lug 41 is inserted in the opening 42 of the tube 25. The apertures 38 and 39 are aligned with one another and with a further threaded opening formed in the tube 25 and a fastening means 43, such as a screw, is advanced therethrough to tighten the blade assembly to the outer periphery of the tube 25.

The detachable blade arrangement described is readily adapted for efficient use with the rotary cutter structure of the present invention. As can be readily appreciated, each blade can be attached or detached without requiring the use of special tools or equipment. This is particularly important from the standpoint of maintenance with the user being able to remove any or all of the blade members for replacement purposes or for the purpose of sharpening the same.

Figs. 5–7 illustrate a modification of the blade member 33 and blade holding means readily adapted for detachable mounting on the tube 25'. As particularly shown in Fig. 5, the blade member 33' is of the same structural arrangement as the blade member 33 described above. Due to the structural similarity between these two forms of blade members, primed reference numerals are used in Figs. 5 and 7 to indicate similar structural parts. The blade member 33 is modified only to a slight degree in that the bottom wall 34' of the blade member mounting portion is not provided with the opening 38 described earlier in connection with the blade member 33. As shown in Figs. 6 and 7, a strap 44 having a raised arcuate central portion 45 and oppositely positioned, downwardly offset attaching ears 46 integrally formed with the ends of the central portion 45 is particularly adapted for detachably mounting a blade 33' to the outer periphery of the tube 25'. Each of the attaching ears 46 of the strap 44 is provided with a drilled opening 47 through which fasteners 48, such as screws, are received and threadedly advanced into aligned openings in the tube 25' following the positioning of the strap 44 between the upstanding side walls 35' of the blade member 33' in engagement with the top surface of the bottom wall 34'. The attaching ears 46 are sufficiently offset to accommodate the thickness of the bottom wall 34' and tightly hold the blade member 33' in its operative position on the tube 25' while allowing ready detachment for replacement or maintenance purposes.

Fig. 8 illustrates still a further modified form of blade member 49 and blade member holding means in the form of spaced bracket-like plates 50 suitably attached to the tube 25" by rivets 51. The blade member 49 is provided with a mounting portion defined by an arcuate bottom wall 52 having integrally formed along opposite side margins upwardly directed side walls 53 which are inclined toward one another. The top margin of each side wall 53 has integrally attached thereto a cutting portion 54 which extends upwardly in an outwardly inclined relation therefrom. Each of the cutting portions 54 are of at least substantially the same configuration as the cutting portions 36 and 36' previously described. The angular relationship between the cutting portions 54 and the tube 25" is also substantially the same.

The area of juncture between each side wall 53 and cutting portion 54 defines an outer groove 55 extending along the side margins of the blade member 49. Each bracket-like plate 50 is provided with a generally horizontal outer portion in engagement with the outer periphery of the tube 25" and attached thereto by the rivets 51. An integrally joined inner portion 56 is also provided which is inwardly and upwardly inclined away from the outer surface of the tube 25". The ends of the portions 56 are substantially received within the grooves 55 and the inner surface of each portion 56 is in holding engagement with the outer surface of an adjacent side wall 53. In this manner each blade member 49 is frictionally held in its operative position on the tube 25" and the blade member may be detached from the tube 25" by forcing the blade in a direction following the contour of the outer surface of the tube 25" to an extent that the blade member eventually clears the holding flange portion 56. The holding plates 50, in effect, define therebetween a groove which is preferably narrower at one end into which the blade member 49 is force-fitted and retained by frictional engagement with the holding plates 50.

Fig. 9 illustrates still a further modification utilizing a blade member 57 held in operative position on the outer periphery of the tube 25''' by means of a modified form of blade member mounting plate 58. The blade member 57 includes a mounting portion which is defined by a raised intermediate wall 59 having formed integrally on the side margins thereof depending side walls 60. The side walls 60 extend downwardly in inclined relation toward one another and the bottom margins of the same have integrally formed therewith reversely folded and upwardly and outwardly directed cutting portions 61. The cutting portions 61 are of similar design as previously described conforming to the preferred angular relation existing between the same and the outer surface of the tube 25'''.

The blade member mounting plate 58 is formed with an intermediate bottom wall portion 62 which is in engagement with the outer surface of the tube 25''' and attached thereto by a suitable fastener such as a screw 63. The side margins of the bottom wall 62 has integrally formed therewith upwardly directed and outwardly inclined blade member engaging walls 64 which are received within the mounting portion of the blade member 57 in tight frictional engagement with the inner surfaces of the depending side walls 60. The blade member 57 is thus detachably mounted on the outer surface of the tube 25''' and can be removed by forcing the same in a direction following the contour of the tube 25''' to an extent that the mounting plate 58 is no longer received within the mounting portion of the blade member 57, the mounting portion of the blade member 57 and the mounting plate 58 being preferably wedge-shaped.

Fig. 10 illustrates another modified form of blade member 65 frictionally held within a blade member holding means 66 suitably attached to the outer surface of the tube 25''' by welds. The blade member 65 consists of a transverse bottom wall 67 of substantial width having integrally formed with the opposite side margins thereof upwardly directed and inwardly inclined cutting portions 68. The angular positioning of each cutting portion 68 relative to the outer surface of the tube 25''' is 45° or greater and the upper ends of the cutting portions 68 are sufficiently spaced from one another to allow shedding of the cut material therefrom. In all other respects the cutting portions 68 are similar in design to those previously described.

The blade member holding means 66 conforms in shape to the bottom portion of the blade member 65 by being provided with a bottom wall 69 of greater width than the blade member 65 and having formed along opposite side side margins thereof upwardly extending and inwardly inclined side walls 70. The bottom portion of the blade member 65 is telescopically received within the holding plate 66 and the inner surfaces of the side walls 70 are in frictional engagement with the outer surfaces of the innermost end portions of the cutting portions 68. The blade member 65 is forced in a direction following the contour of the tube 25''' into and out of frictional holding engagement by the mounting plate 66.

The various modified blade member structures described can be inexpensively manufactured for original installation on the rotary cutter and for replacement sales. The cutting portions carried by the blade members may be inclined away from one another or inclined toward one another leaving an opening between the outermost ends thereof for shedding purposes. The tubes 25, 25', 25'', 25''', or 25'''' may be mounted in any suitable manner for rotation in a lawn mower structure and, if desired, stub shafts may be used to support the ends thereof on suitable bearings in place of the fixed shaft disclosed. Such variations are well within the skill of the art and for purposes of simplification are not illustrated in the drawings.

The blade member holding means disclosed in Figs. 8–10 frictionally hold a blade member against displacement on the outer periphery of the tube. While the use of threaded fastening means, rivets and welds have been illustrated in connection with certain embodiments described, it will be readily appreciated that any suitable fastening means can be used particularly in connection with attaching the socket-like blade member holding means on the outer surface of the tube, this type of holding means not requiring detachment from the tube for purposes of blade removal. For proper wedging engagement between the blade members and the blade holding means disclosed in Figs. 8–10, the holding means will preferably be tapered at the front or leading edge in the known manner to provide a slightly greater width at the leading edge which decreases toward the back or trailing edge. This decrease in width further enhances the tight wedging action provided when the blade members are mounted on the tube.

The various forms of blade members illustrated are particularly desirable in that they are less expensive to manufacture due to the relatively small amount of material utilized in forming the same. They are also less expensive in that they require the use of a less amount of carbon heat-treated steel as this expensive material need not be used in forming the center sections or mounting portions. In other words, high carbon heat-treated steel is necessary only in forming the cutting portions and the mounting portions may be formed from less expensive material.

The rotary cutter utilizing a basic rotatable tube structure on which is mounted a plurality of detachable blades in the manner described may be operated at high tip speeds without bowing or without center of gravity displacement to an extent that the efficiency of the cutting action is adversely affected. Any desired length of cutter can be manufactured to meet the varying market requirements. An increase in tip speed can be obtained without increasing the speed of rotation of the tube by merely increasing the diameter of the tube. With this type of structural variation, tube balance is much less critical as compared with the balance of a shaft. The rotary cutter can be provided with increased effective cutting length and operation of a longer cutter will not be hindered by vibration due to critical speed operation as a greater stiffness per unit of weight can be obtained by use of a tube as compared with the use of a shaft. Due to the availability of higher tip speeds at a lower rotational speed by use of a tube, the drive mechanism may be of uncomplicated design and less expensive in manufacture.

In mounting the rotary cutter in a lawn mower structure such as that disclosed in Fig. 1, it is preferable to operate the cutter to rotate the same in a direction away from the operator at the point of contact with the material to be severed. The housing 17 is provided with an extended rear portion which gradually slopes downwardly to act as a shield thus preventing objects being thrown upwardly and rearwardly toward the operator. The cut particles are then deposited immediately behind the mower as it is moved along the ground. Suitable rotary cutter height adjustment means can be provided in the lawn mower structure and such has not been disclosed or discussed as it does not constitute a part of the present invention.

Obviously many modifications and variations of the invention as hereinbefore set forth may be made without departing from the spirit and scope thereof, and therefore only such limitations should be imposed as are indicated in the appended claims.

I claim:

1. A rotary cutter for use in a lawn mower, said cutter including a rotatable tube detachably carrying on the outer periphery thereof a plurality of generally U-shaped blade members, said blade members each being defined by a transversely flat horizontally extending blade mounting portion having integrally formed therewith along the sides thereof a pair of outwardly directed cutting portions which are inclined relative to one another, a forward marginal edge portion of each cutting portion including a bevel defining a cutting edge thereon, and blade member holding means mounted on said tube and in engagement with the blade mounting portion of each blade member to detachably hold the blade member in its operative position on said tube.

2. A rotary cutter for use in a lawn mower, said cutter including a rotatable tube detachably carrying on the outer periphery thereof a plurality of generally U-shaped blade members, said blade members each being defined by a transversely flat horizontally extending blade mounting portion having integrally formed therewith along the sides thereof a pair of outwardly directed cutting portions which are inclined relative to one another, a forward marginal edge portion of each cutting portion including a bevel defining a cutting edge thereon, and blade member holding means mounted on said tube and in engagement with the blade mounting portion of each blade member to detachably hold the blade member in its operative position on said tube, said blade members being mounted to form a plurality of longitudinally extending rows with the blade members of each successive row being offset to provide for overlapping cutting areas.

3. A rotary cutter for use in a lawn mower, said cutter including a rotatable tube detachably carrying on the outer periphery thereof a plurality of generally U-shaped blade members, said blade members each being defined by a transversely flat horizontally extending blade mounting portion having integrally formed therewith along the sides thereof a pair of outwardly directed cutting portions which are inclined away from one another, a forward marginal edge portion of each cutting portion including a bevel defining a cutting edge thereon, and strap-like blade member holding means mounted on said tube and in engagement with the blade mounting portion of each blade mounting member to detachably hold the blade member in its operative position on said tube.

4. A rotary cutter of claim 1 wherein said blade mounting portion is itself generally U-shaped with an arcuate bottom wall conforming to the curvature of the outer periphery of said tube and upstanding side walls which are integrally formed at the tops thereof with said cutting portions.

References Cited in the file of this patent

UNITED STATES PATENTS

| | | |
|---|---|---|
| 2,509,343 | Henderson | May 30, 1950 |
| 2,590,065 | Mott | Mar. 18, 1952 |
| 2,625,782 | Allred | Jan. 20, 1953 |
| 2,711,067 | Mott | June 21, 1955 |
| 2,836,023 | Caldwell | May 27, 1958 |